United States Patent [19]
Tarnowski

[11] 4,455,563
[45] Jun. 19, 1984

[54] SYSTEM AND FILM GATE FOR ACCURATELY IMAGING INFORMATION ON A FILM BY A CHARGED PARTICLE BEAM

[75] Inventor: Andrew A. Tarnowski, New Caanan, Conn.

[73] Assignee: Image Graphics, Inc., Fairfield, Conn.

[21] Appl. No.: 279,834

[22] Filed: Jul. 2, 1981

[51] Int. Cl.³ .............................................. G01D 15/06
[52] U.S. Cl. ................................ 346/161; 346/110 V; 346/158
[58] Field of Search .................... 346/158, 159, 110 V, 346/161

[56] References Cited

U.S. PATENT DOCUMENTS

| | | | |
|---|---|---|---|
| 1,736,456 | 11/1929 | Matthias | 346/110 V |
| 3,504,371 | 3/1970 | Reeds, Jr. | 346/158 X |
| 3,553,709 | 1/1971 | Jones | 346/110 V X |
| 4,300,147 | 11/1981 | Tarnowski | 346/159 |

*Primary Examiner*—Thomas H. Tarcza
*Attorney, Agent, or Firm*—Roland T. Bryan

[57] ABSTRACT

An improved particle beam recorder system having a pressure equalizing film gate including a platen for receiving a film thereon in pressure relieved relation to avoid trapping distortion causing air between the film and the platen. The platen can provide a curved film receiving surface and a predetermined tension can be applied to the recording film disposed on the platen to assure positive contact between the film and the platen. A motor driven film advance system is provided to intermittently advance the film through the film gate to thereby intermittently provide fresh and stationary film for exposure and image recording. A particle beam generator is disposed in predetermined relation with the film and the film gate and the recording beam produced thereby is electronically positionally corrected for the known geometric distortions introduced by a predetermined continuous curvature of the film gate and the predetermined tensioning of the film to produce accurate imaging on the film.

10 Claims, 5 Drawing Figures

SYSTEM AND FILM GATE FOR ACCURATELY IMAGING INFORMATION ON A FILM BY A CHARGED PARTICLE BEAM

BACKGROUND OF THE INVENTION

This invention relates to charged particle beam recording on a film as disclosed in copending U.S. application Ser. No. 023,548, now U.S. Pat. No. 4,300,147, and more specifically to an improved system and film gate for more accurately producing an image on an electron sensitive film with an electron beam. Such systems find particular utility in the graphic recording industry and provide accurate and high resolution imaging. Thus, electron beam recording is especially useful for, producing computer output microfilms (COM), mass data storage, wide bandwidth signal recording, satellite photography, automated cartography as well as computer micrographic and seismic recording.

Essential elements of an electron beam recorder (EBR) include an electron gun, an electromagnetic focusing and deflection system, an electron sensitive film and a film gate. In operation, the electron beam traces or plots an image in the recording area on the emulsion side of a stationary electron sensitive film accurately positioned in the film gate. Electron beam recording is conducted in a vacuum atmosphere because air can scatter or attenuate the electron beam. In a particular embodiment, a three stage vacuum system is used in an electron beam recorder system with the volume with highest vacuum containing the electron gun, a lower vacuum volume containing a beam path to the emulsion side of the recording film and the lowest vacuum in the volume containing the film dispenser and transport mechanisms. This three stage vacuum system provides for rapid access to the film for the easy changing or replacement thereof. However, it has been discovered that at times a small distortion occurs in the image on the film and in some applications of the inventions these distortions limit its value. It is believed that the differential pressure exerted on the film by the three stage vacuum can adversely affect the shape of the film because it creates variable and unpredictable buckling of the film in the film gate. Moreover, from time to time, the film may be further distorted by air entrapped behind the film that may originate from the outgassing of water vapor or other atmospheric constituents contained in the film or by air which is transported by the film from the lower vacuum volume into the film gate as the film is advanced to provide fresh film for exposure.

It is recognized that instabilities and uncertainties in the position of the recording film relative to the beam are a primary limitation on the geometric accuracy with which an image can be recorded on the film by high performance EBRs.

As disclosed in copending U.S. patent application Ser. No. 023,548, now U.S. Pat. No. 4,300,147, the disclosure of which is incorporated by reference herein, an EBR film gate can be made having a film receiving surface shaped to a predetermined configuration, so as to precisely position a recording film along a predetermined continuous curvature. The continuously curved film gate may also include a means for continuously and uniformly tensioning the recording film to conform the film to the predetermined continuous curvature of the film gate. Thus the distortions which have heretofor caused instabilities and uncertainties in the position of the recording film have been eliminated and the film is controlled so that these distrotions conform to a known geometric form and are thereby made predictable. In operation, the electron beam is electronically controlled to compensate for these predictable and known geometric distortions to create an essentially geometrically distortionless image on the recording film.

While the geometrically distorting film gates in the aforementioned applications have improved substantially the geometric accuracy of the EBR recording, that film gate has not completely eliminated those film distortions which are not correctable by a film gate which only geometrically distorts the film. More particularly, it has been found that the charged particle recording film does not always lie contiguous with or flat against the film receiving surface of the film gate platen and is sometimes distorted because it is spaced therefrom by air or gases trapped between the film and the film receiving platen which form bubble like protrusions. The bubble is due to the fact that the electron receiving face of the film is exposed to a higher level vacuum than the rear face of the film which is in contact with the lower level vacuum present in the volume occupied by the film transport mechanism. Even though trapped air or gases which can cause the bubble like effect represents a substantially less significant source of film distortion than for instance film buckling or film outgassing, it is desireable to reduce or eliminate this bubble like effect.

SUMMARY OF THE INVENTION

The present invention overcomes the bubble like distortion problems associated with films employed in prior EBR film gates by ventilating the volume behind the film as it lies on the film receiving surface of the film gate platen to prevent the trapping of air between the film and the film receiving surface. More particularly, in a preferred embodiment, the portion of the film gate platen receiving the rear surface of the film is ventilated to the higher vacuum than is present on the forward side of the film to equalize the pressure applied to the front and rear film surfaces and eliminate the pressure differential across the film which can otherwise trap air or gas between the film and the platen and cause unpredictable and irregular film distortion.

The present invention thus provides an improved vented and pressure equalizing film gate which more precisely locates a film therein and more accurately positions a film relative to a charged particle beam. The invention also provides for an improved EBR recording systems which uses an improved vented and pressure equalized film gate to provide for the more accurate imaging of information on a charged particle sensitive film.

It is therefore an object of this invention to provide a film gate and a recording system which further eliminates film distortion and more accurately and precisely positions the film relative to a beam.

The present invention is useable in combination with platens which impart various predetermined curvatures to the film, which curvatures can be simple or compound, of fixed or variable radii, concave or convex, along the length or width of the film or any other continuous configuration. Advantageously, the film gate of the present invention provides a ventilated platen of predetermined curvature along a prespecified length of film and a predetermined force to hold the film in contact with the ventilated film platen.

Further it is an object to provide a maximum vent surface area in the film receiving platen without impairing the predetermined curvature of the platen and its ability to provide adequate structural support for the film.

It is a further object of this invention to provide a film gate system for a charged particle beam recorder wherein the film is held in contact with the film gate through predetermined tension.

It is still a further object of this invention to provide a film gate system for a charged particle beam recorder wherein the film is intermittently advanced through the film gate to expose fresh portions of film to the charged particle beam.

Further objects, features and a more complete understanding of the present invention, which may admit to a number of possible variations, will be apparent from the following detailed description which, considered in conjunction with the attached drawings, represents the preferred embodiments of this invention and should be considered in an illustrative and not in a limiting sense as follows:

DETAILED DESCRIPTION

Figure 1:
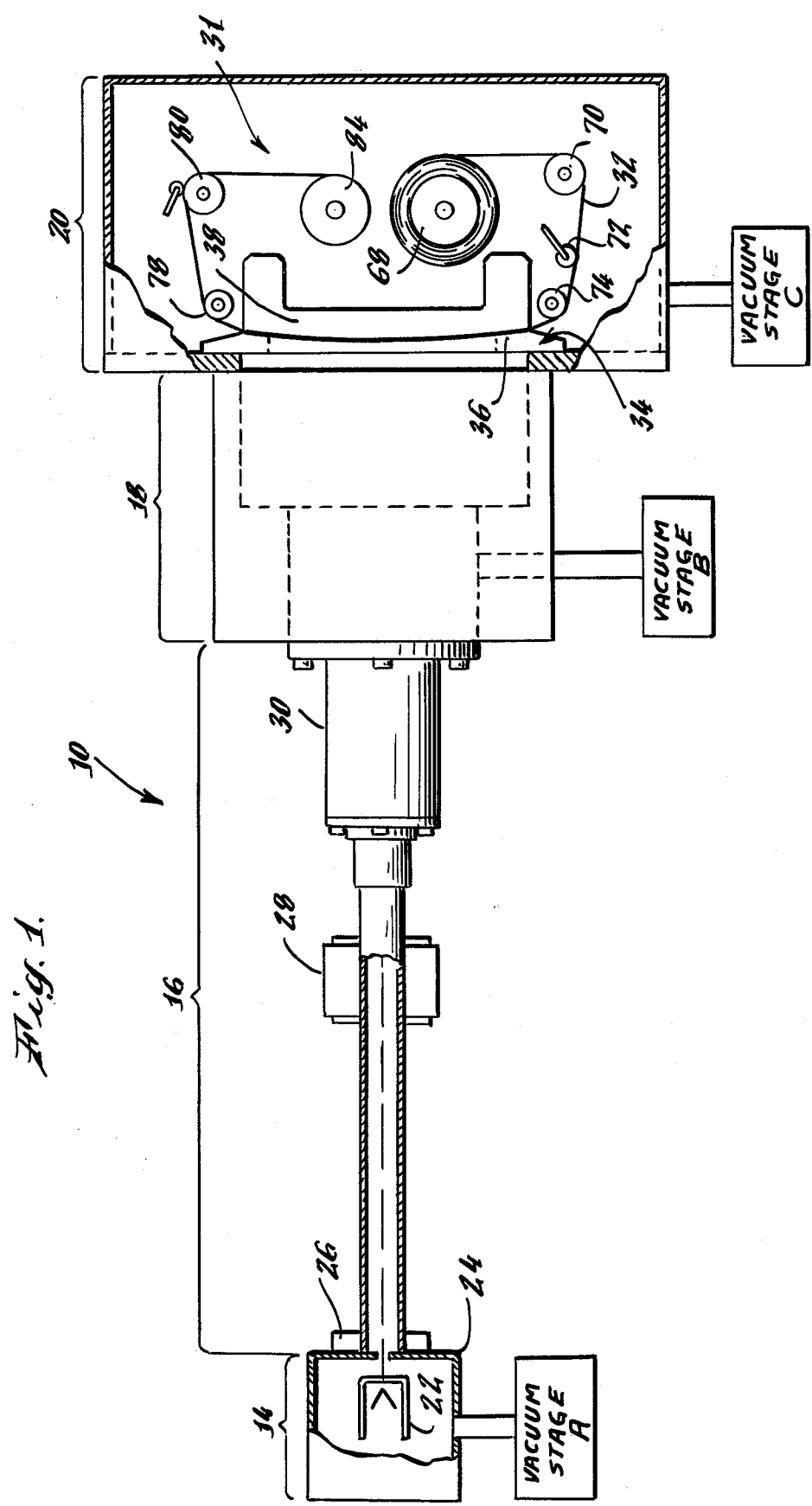
FIG. 1 is a top partially sectionalized view of an improved electron beam recorder system in accordance with the present invention.

In accordance with the disclosure of the preferred embodiment of this invention, it is intended that FIG. 1, illustrate a preferred embodiment of a complete charged particle beam recorder system generally designated 10. The complete electron beam recorder (EBR) includes a vacuum housing which can be divided into four volumes 14, 16, 18 and 20. Section 14 is reduced to a high vacuum atmosphere by vacuum stage A (for instance $10^{-7}$ Torr) volumes 16 and 18 are reduced to lesser vacuum atmospheres by vacuum stage B (for instance $10^{-5}$ Torr) and volume 20 is reduced to a still lesser vacuum atmosphere by vacuum stage C (for instance $10^{-1}$ Torr). The vacuum atmosphere produced by vacuum stages A, B and C can be established by for instance conventional vacuum pumps.

A charged particle recording beam is produced in the high vacuum volume 14 by a charged particle emitter 22 such as a conventional high resolution triode electron gun 22 having a directly heated thermionic emitter contained therein. High vacuum volume 14 is separated from the lesser vacuum volume 16 by for instance a partition wall 24 having a beam aperture therethrough. The vacuum section 16 provides for electromagnetic control of the beam by for instance three electromagnetic coils 26, 28, and 30 which in a preferred embodiment at least partially surround the beam path through the vacuum volume 16. The electromagnetic coils 26 and 28 center and focus the beam while the electromagnetic coil 30 for instance deflects the beam to effect for instance image plotting or tracing by the beam. Conventional electronic methods can be used to alter control signals applied to coil 30 to correct the beam deflection to compensate for known geometric distortions of a recording surface such as a curved electron sensitive film 32 to thereby produce the desired information image on the film.

The vacuum volume 18 provided by stage B, provides addtional vacuum space in which to accommodate the deflected particle beam produced by the gun 22. The vacuum volume 20 provided by stage C, contains a film transport gate mechanism generally indicated at 31 and a film gate indicated generally at 34, illustrated in more detail in FIGS. 2 and 5. The film gate 34 is between the higher and lower vacuum volumes 18, 20 respectively and is constructed and arranged to accurately position a charged particle sensitive recording means such as an electron sensitive emulsion coated film 32 in predetermined relation to the particle gun 22. The film, 32 can be a conventional type such as that available from Eastman Kodak under the designation SO 219. The film gate transport means 31, advances the film from the lower vacuum volume 20 into the film gate 34 and the higher vacuum volume 18 as will be described hereinafter.

An electron beam striking the film 32, causes a chemical change in the film, which, with further conventional treatment, can be developed to produce a desired information image.

As will be recognized by one skilled in the art, electron beam recording is particularly suited to high resolution, photography such as satellite or scanner data displays where a large number of high quality pictures are produced at electronic speeds. Computer controlled EBR recording systems offer particular advantages for the study and investigation of hydrology, geology, ecology, agriculture, meteorology, cartography, and land use. Particular EBR systems can provide data handling capacities for (1) high image throughout (2) on-line corrections of geometric and radiometric errors caused by the sensor and satellite position (3) on-line annotating and framing of the continuous stream sensor data; (4) high image resolution and dynamic range; and (5) dramatic time and cost reductions associated with eliminating the need to reformat and computer process, off-line, the raw sensor data for each image to obtain a radiometrically and geometrically corrected image. The EBR systems is also useful for automated cartography to produce map products by the various recording techniques such as vector plotting, names and text compositions, or rester scanning. Image formats can be varied depending upon the film size and film transport used. Additionally, EBR recording provides total composition and plotting capabilities compatible with any one or a mixture of sources to enable the production of high energy quality graphics such as line work, alphanumerics, symbols/trademarks, or graphic arts quality type. Almost any film format can be utilized with a micrographics EBR for such film recording applications as micropublishing, business data computer output micrographics (COM), engineering drawings and seismic data display.

Current performance levels of the micrographics EBR system indicate that the system could be readily adapted for electronic composition and recording of textbooks, magazines, or manuals on film. Text, halftones and graphics can be commingled electronically on a film sheet. The film sheet can then be enlarged to produce a printing plate for use with conventional printing presses.

The various recording and production capabilities of the EBR system 10 depend heavily on the accurate, stable and defined positioning of the film 32 in a known relationship with the film gate 34 and the charged particle beam produced by the gun 22. The charged particle beam is sensitive to molecular particle scattering and hence it is highly desirable to dispose the beam impact face of the recording film 32 within a vacuum atmosphere to avoid such scattering.

However, more recently, it has been found that the disposition of a recording film 32 in a film gate 34 between high and low vacuum atmospheres 18 and 20 respectively can create minor bubble like distortions in the film surface, attributable to air brought into the film gate as the film is advanced therethrough and subsequently trapped between the film and the film gate. These bubble like distortions can for some applications impair the accuracy of the beam imaging and the utility of the EBR system.

Figure 2:
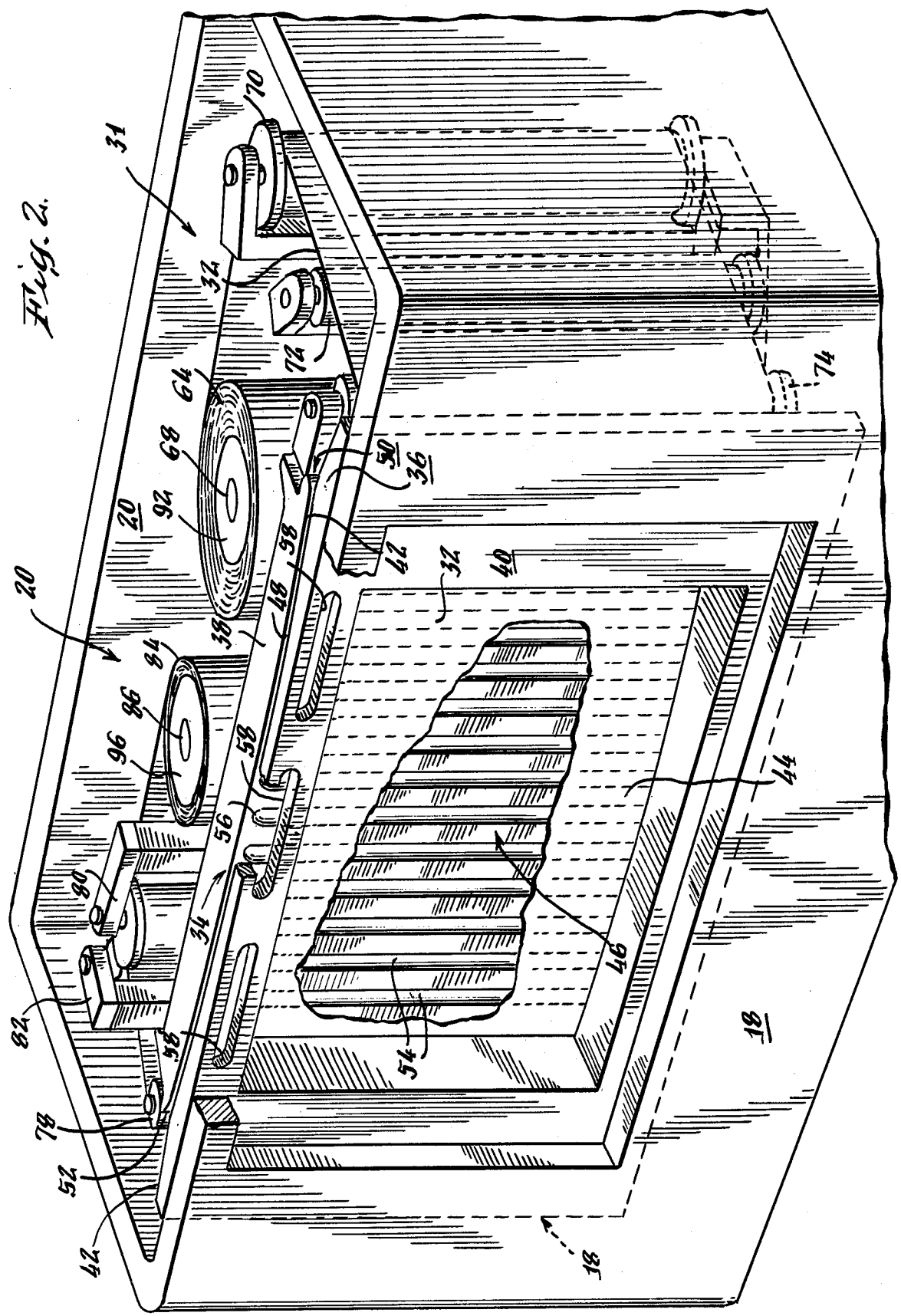
FIG. 2 is an enlarged partially sectionalized perspective view of a preferred embodiment of the improved film gate of the present invention shown in FIG. 1.

Referring now to FIG. 2, an elevational perspective view of a preferred embodiment of the vented, pressure equalizing film gate 34 of the present invention is shown to be comprised of a film frame 36 and film platen 38. The film frame 36 has a forward reference surface 40 for positioning the frame 36, the gate 34 and the film 32 carried therein relative to the charged particle gun 22. The frame 36 has also a rear surface 42 for defining a film path between the frame 36 and platen 38. The frame 36 further includes an exposure aperture 44 therethrough from the forward reference surface 40 through the rear surface 42. The platen 38 has a film receiving surface generally designated at 46 bordered by a non film receiving surface 48. The surface 48 acts as the principal barrier between the higher pressure volume 18 due to stage C and the lower pressure volume 20 from stage B. The film receiving surface 46 of the platen 38 is separated from the rear surface 42 of the frame 36 by approximately two film thicknesses thus defining a film path therebetween having a means for film ingress 50 and means film egress 52.

The means for ingress 50 is defined by the lead edges of the film platen 38 and the frame 36 while the means for egress 52 is defined by the trailing surface of the platen 38 and frame 36. Accordingly, as new film 32 is advanced through the film gate 34 it is exposed to a high vacuum applied from vacuum volume 18 within the film gate 34 through the frame aperture 44. Therefore there is a higher vacuum applied to the face surface of the film 32 within the film gate 34 than is applied to the film in the vacuum 20. The effect of the condition is that as new film is advanced into the gate 34 and stopped at the imaging position, air, from vacuum volume 20, is carried behind the film 32 into the film gate 34 between the receiving surface 46 and the barrier surface 48. This air behind the film 32 in the film gate 34, unless otherwise vented, can cause a bubble like bulge in the film toward the beam Accordingly, the platen 38 of the present invention is provided with a means for pressure relieving the platen film receiving surface 46 whereby the pressure across the film 32 is equalized and the platen 38 has less surface area against which air or gas, can be trapped between the back of the film 32 and the platen 38.

It is however preferred that the means for pressure relieving the platen 38 should neither detract from nor interfere with the ability of the platen 38 to impart a predetermined continuous curvature to a film 32 carried thereon. In a preferred embodiment, the film gate 34 is provided with a means 54 for venting the film receiving surface 46 which is recessed in the surface of the platen 38 and is connected in pressure relieving relation to an atmosphere applied to the forward film surface.

Figure 3:
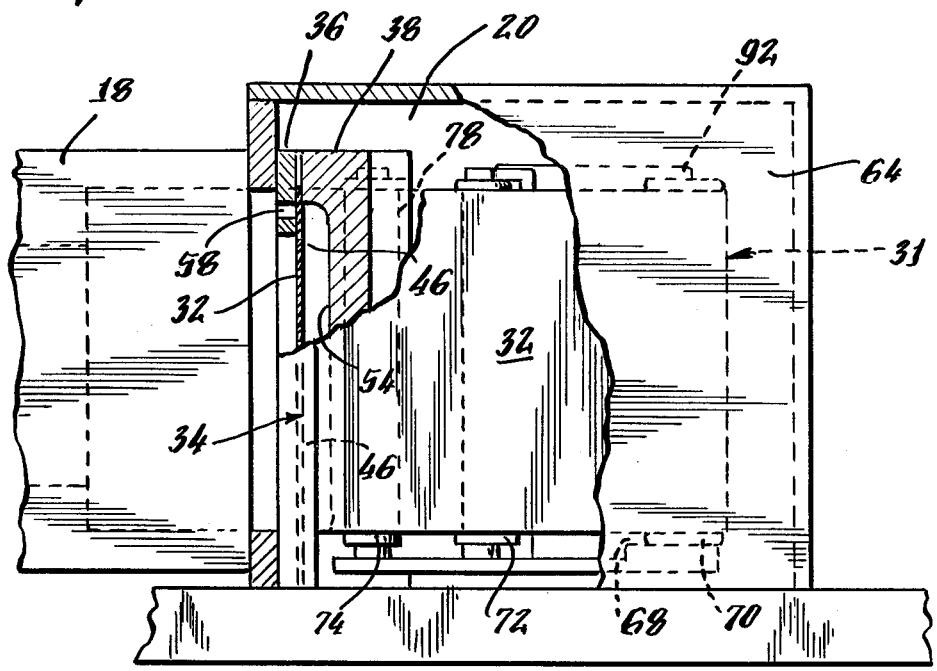
FIG. 3 is a side view illustration of a preferred embodiment of the film gate shown in FIG. 1.

In a preferred embodiment, as in FIGS. 2 and 3 the means 54 for venting comprises a plurality of grooves disposed in the film receiving surface 46 of the platen 38 which extends into the non film receiving surface 48 of the platen 38 and an orifice 58 through the frame 36 adjacent the extended portions 56 of the grooves 54 disposed in the non film receiving surface 48 of the platen 38 to thereby provide a through connection between the pressure atmosphere applied to the forward film surface and the rear surface of the film residing on the platen 38.

In a further preferred embodiment, the plurality of parallel grooves 54 are disposed in the film receiving surface 46 of the platen 38 in a direction perpendicular to the direction of film travel through the film gate 34. In an actual embodiment the film platen 38 has two, one quarter inch wide grooves per inch. The venting of the film receiving surface 46 of the platen 38, reduces the surface area of the overall film receiving surface 46 of the platen 38. Thus, if a differential pressure were to occur across the film 32, the film 32 would tend to buckle or yield in the direction of the pressure gradient. It is therefore of critical importance that, the film of the present invention gate 34 position the film 32 in a pressure equalized manner to eliminate a pressure gradient across the film. Accordingly, it is preferred that the platen film receiving surface 46 be vented to the atmosphere applied to the beam face of the film 32.

It will additionally be recognized by one skilled in the art, that it is desirable to maintain the film supply volume 20 of the EBR system 10 of the present invention in only a partial vacuum $10^{-1}$ Torr, to enable easy access to the film 32 for changing while simultaneously maintaining the beam path and deflection volumes 16 and 18 respectively of the EBR system at a relatively complete vacuum ($10^{-5}$ Torr) to obviate molecular scattering of the particular beam.

Gases present on the emulsion face of the film are easily dissipated by the higher vacuum volume 18 in contact with the emulsion face of the film 32. However, gases carried on the rear surface of the film 32 can often become trapped between the film 32 and the platen 38 as a bubble which introduce distortions in the disposition of the film 32 and thereby impair the accuracy of the beam imaging. It is therefore desirable to vent the film receiving surface 46 of the platen 38 to the high vacuum volume 18 contiguous with the film face.

In FIG. 3 film 32 enters the film gate 34 through passage between the curved frame 36 and the juxtaposed curved platen 38. The opposed film surfaces 42 and 46 of the curved frame 36 and curved platen 38 respectively are spaced such that the electron sensitive film 32 is relatively free to move along its length but is prevented from substantial motion towards or away from the electron gun 22.

Figure 4:
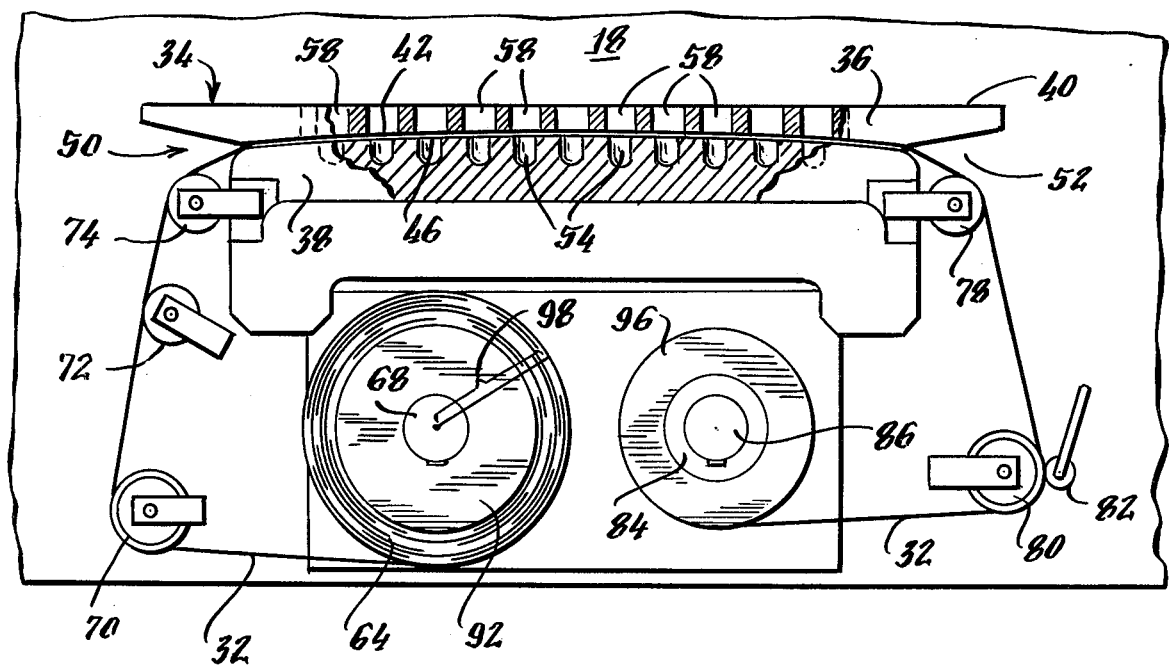
FIG. 4 is a top view of preferred embodiment of the film gate shown in FIG. 1.

Referring now to FIG. 4, the electron sensitive film 32 is supplied by film supply reel 64 which is mounted on film supply shaft 68. The electron sensitive film 32 passes over a roller 70, over out of film sensor 72 and over roller 74 before entering the film gate 34. To facilitate the operation of the vacuum system, a spacing of approximately twice the thickness of the electron sensitive film 32 is considered appropriate.

The film gate 34 illustrated in more detail in FIG. 4 is also provided with a transport means 31 for moving the film 32 through the ingress means 50 and the egress means 52 from the volume 20 to the volume 18. This transport means applies tension to the film 32 to hold the film 32 against the film receiving surface 46 to thereby impart the predetermined curvature of platen 38 to the electron sensitive film 32 while in the film gate 34. Application of a predetermined level of tension to the electron sensitive film 32 further assures that the electron sensitive film 32 will maintain contact with the film receiving surface 46 of the curved platen 38 to assure that the predetermined curvature of surface 46 will be imparted to the electron sensitive film 32. The position of the electron beam is readily corrected by for instance the electromagnetic deflection coil 30 to compensate for the predictable distortions in the recording film 32 established by the predetermined curvature of the film gate 34 and predetermined film tension.

In operation, the film 32 is stationary in the film gate 34 and electron gun 22, plots or traces a prespecified image, either continuously or intermittently on the film 32. When conventional electron sensitive film 32 is used, it has been found appropriate to use a radius of curvature of approximately 130 inches for the film receiving surfaces 46 of curved platen 38.

The film 32 leaving the film gate 34 exits through the means for egress 52 from the volume 18 back into the volume 20, passes over roller 78 passes between metering roller 80 and roller 82 and winds onto take up spool 84. Take up spool 84 is mounted on take up spindle 86.

Figure 5:
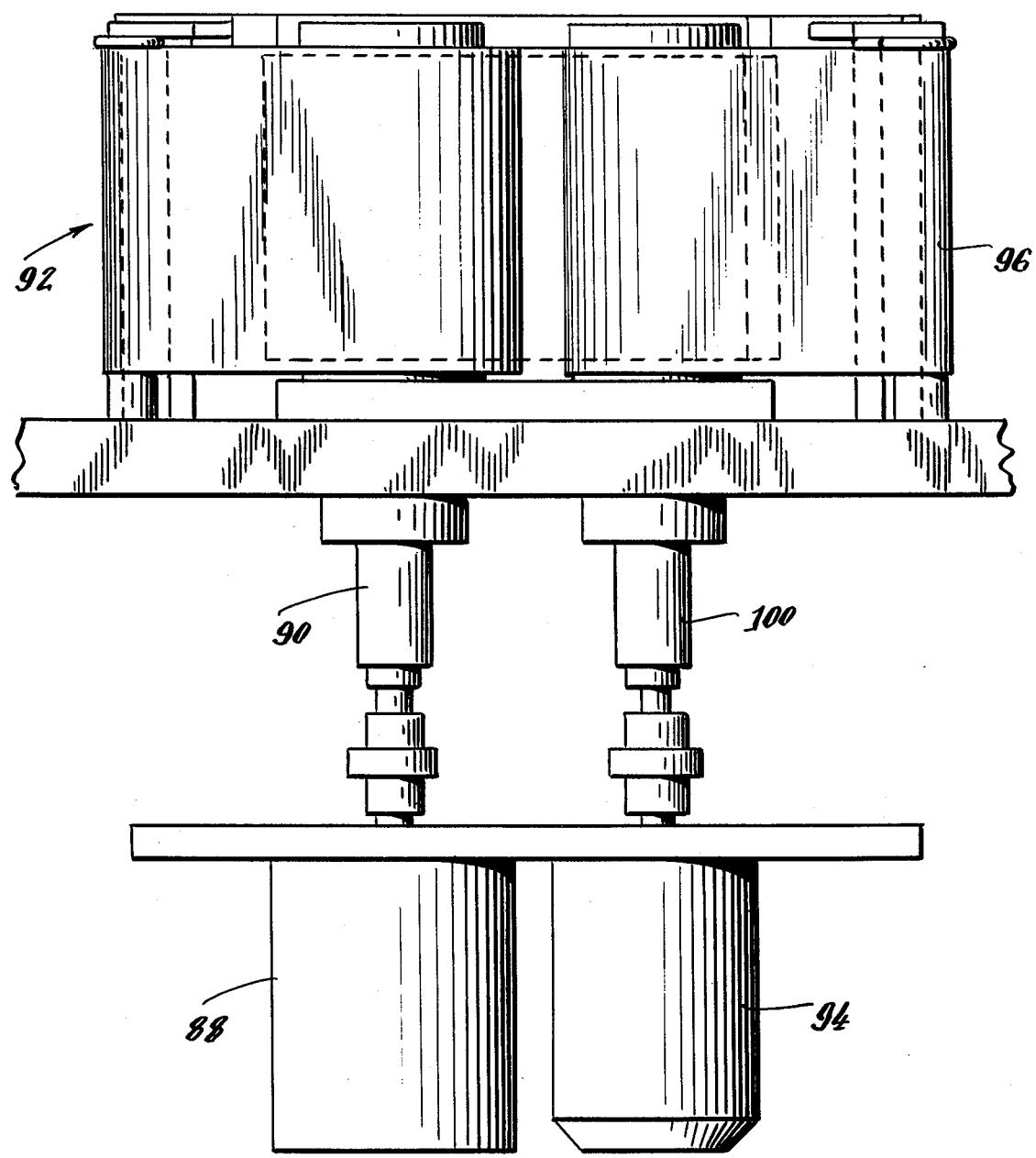
FIG. 5 is a plan view of the film advance and tension means used in combination with the film gate of FIG. 1.

Referring to FIG. 5 a means of applying tension to the recording film 32 and means for advancing the film 32 are illustrated. A conventional torque motor 88 is connected to film supply shaft 90 and causes a predetermined torque to be imparted to the film supply spool 92. This predetermined torque acting on the film, fixed by a conventional locked advance motor 94 coupled to take up spool 96, results in a predetermined tension on the electron sensitive film 32 which varies inversely with the radius 98 of the film on supply spool 92. As indicated previously, this predetermined tension assures that the electron sensitive film 32 will maintain good contact with the film receiving surface 46 of the curved platen 38. It has been found that when 5½ inch size 4 mil thick conventional film is used, a tension of approximately 20 ounces is appropriate.

The conventional advance gear motor with brake 94 is connected to take up shaft 100 and operates in an intermittent manner to draw a fresh area of electron sensitive film 32 through the film gate 34. During exposure to the electron beam the recording film 32 is stationary.

One of ordinary skill in the art will recognize that the frame orifice 58, can be comprised of a single opening through the frame 36, connecting the platen vents 54 in parallel to the vacuum volume 18 applied to the forward or beam face of the film 32.

It should be understood that the preferred embodiment described herein are only intended to be illustrative of the present invention. It will be appreciated that the present invention provides an improved and practical charged particle beam recording system and an improved film gate therefore. Although the system has been described with particular reference to electron beam recording, it is readily apparent that the improved gate and system of the present invention may be used in combination with a variety of different charged particle producing devices including those which produce protons and ions. Those skilled in the art will further recognize that the curvature of the film gate may be of any continuous type and that the invention may be practiced with or without any specific tensioning of the film.

Further, while the invention has been described in its preferred form with a certain degree of particularity, it is understood that the present disclosure of the preferred embodiment is made by way of example and that modification in the details of construction may be resorted to without departing from the true spirit and scope of this invention. It is intended that the patent shall cover, by suitable expression in the appended claims, whatever features of patentable novelty exist in the invention disclosed.

What is claimed is:

1. A system for accurately imaging a film by a charged particle beam comprising means defining a first volume having a high vacuum therein through which a charged particle beam is projected means defining a second volume having a partial vaccum therein lower in pressure than said first volume a film gate having a film positioning platen positioned transverse to said beam of charged particles to create a barrier between said two volumes, said gate having means for ingress and egress of said film to the higher vacuum volume and the beam face of said platen, said platen having a film receiving surface and a non film receiving surface adjacent to said film receiving surface transport means for moving said film through said ingress and egress means from said second volume across said platen in contiguous relationship therewith for exposing said film to said beam of charged particles in said first volume and vent means in said platen coextensive with said film receiving surface and said non film receiving surface for venting said beam face of said platen behind the film to said first volume to avoid film distortion.

2. The charged particle recording system of claim 1 wherein said means for venting said platen comprises at least one groove disposed in said platen film receiving surface.

3. The charged particle recording system of claim 1 or 2 wherein said at least one groove is disposed transversely to the direction of film advance through said gate.

4. The charged particle recording system of claim 2 wherein said first gate includes a film frame adjacent to said means defining at first volume, said film being received between said platen and said film frame, and wherein at least one groove is connected through said film frame to said first volume applied to said beam face of said film.

5. The charged particle recording system of claim 1 wherein said platen comprises a plurality of grooves connected through a common vent.

6. The charged particle beam recording system of claim 1 further comprising a tension means for applying a predetermined lengthwise tension to said film to hold the film in close contact with said platen.

7. The charged particle beam recorder of claim 6 wherein said predetermined tension is approximately 20 ounces.

8. The charged particle recording system of claim 1 wherein said platen is provided with a predetermined continuous curvature.

9. The charged particle beam recorder of claim 8 wherein said predetermined continuous curvature is concave relative to the direction of the charged beam.

10. The charged particle recording system of claim 1 wherein said charged particle beam is an electron beam.

* * * * *